United States Patent
Lazarini

(10) Patent No.: US 11,072,310 B1
(45) Date of Patent: Jul. 27, 2021

(54) METHOD AND SYSTEM TO MITIGATE SMART PHONE BATTERY DRAINAGE WHILE USING A VIRTUAL KEY TO ACCESS A VEHICLE

(71) Applicant: GM GLOBAL TECHNOLOGY OPERATIONS LLC, Detroit, MI (US)

(72) Inventor: Marcelo Lazarini, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/848,994

(22) Filed: Apr. 15, 2020

(51) Int. Cl.
*B60R 25/24* (2013.01)
*H04W 76/14* (2018.01)

(52) U.S. Cl.
CPC ............ *B60R 25/24* (2013.01); *H04W 76/14* (2018.02); *B60R 2325/101* (2013.01); *B60R 2325/205* (2013.01)

(58) Field of Classification Search
CPC ............ B60R 25/24; B60R 2325/101; B60R 2325/205; H04W 76/14; H04W 4/80; H04W 12/47; H04W 12/48; H04W 52/02
USPC ................................................ 340/5.61, 5.72
See application file for complete search history.

(56) References Cited

U.S. PATENT DOCUMENTS

| | | | |
|---|---|---|---|
| 6,366,622 B1 * | 4/2002 | Brown ...................... | H04B 1/30 329/304 |
| 8,798,809 B2 | 8/2014 | Kalhous et al. | |
| 9,110,772 B2 | 8/2015 | Huntzicker et al. | |
| 10,202,100 B1 | 2/2019 | Tucker et al. | |
| 2004/0266347 A1 * | 12/2004 | Palin ....................... | G06F 21/44 455/41.1 |
| 2006/0128308 A1 * | 6/2006 | Michael ................ | H04W 24/00 455/41.2 |
| 2007/0174409 A1 * | 7/2007 | Falck ..................... | H04W 48/14 709/208 |
| 2009/0024272 A1 * | 1/2009 | Rogers ................ | G01B 11/2755 701/31.4 |
| 2014/0343755 A1 * | 11/2014 | Rasal ................... | B60R 25/2045 701/2 |
| 2015/0201453 A1 * | 7/2015 | Roeland ................ | H04W 76/16 370/328 |
| 2015/0308396 A1 * | 10/2015 | Elzein ..................... | H04W 4/40 455/420 |
| 2015/0332532 A1 * | 11/2015 | Lee ..................... | G07C 9/00563 340/5.72 |
| 2016/0055699 A1 * | 2/2016 | Vincenti ............... | H04W 12/04 340/5.61 |
| 2016/0063786 A1 * | 3/2016 | Lewis ................ | G07C 9/00309 340/5.72 |

(Continued)

*Primary Examiner* — Edwin C Holloway, III
(74) *Attorney, Agent, or Firm* — Lorenz & Kopf LLP

(57) ABSTRACT

One general aspect includes a system to receive a virtual key at a vehicle, the system includes a memory configured to include a plurality of executable instructions and a processor configured to execute the executable instructions, where the executable instructions enable the processor to establish a dummy short-range wireless communications (SRWC) connection with a mobile computing device; establish a standard SRWC connection with the mobile computing device; receive the virtual key from the mobile computing device through the standard SRWC connection; and where the dummy SRWC connection is configured to cause the mobile computing device to cease attempting to establish one or more additional SRWC connections.

15 Claims, 3 Drawing Sheets

(56) References Cited

U.S. PATENT DOCUMENTS

2016/0203661 A1* 7/2016 Pudar ................. G07C 9/00571
                                                    340/5.25
2016/0262193 A1* 9/2016 Hariharan ............... H04W 4/80
2017/0178035 A1   6/2017 Grimm et al.
2018/0349242 A1* 12/2018 Mathews .............. H04W 12/50
2019/0092280 A1   3/2019 Oesterling et al.

* cited by examiner

METHOD AND SYSTEM TO MITIGATE SMART PHONE BATTERY DRAINAGE WHILE USING A VIRTUAL KEY TO ACCESS A VEHICLE

INTRODUCTION

When accessing and starting a vehicle through a smart phone, the mobile app that stores and retrieves a virtual key within the smart phone is made to run in the background of the smart phone's operating system. While continuously running, this mobile app can take a toll on the smart phone's battery life. Moreover, since the smart phone is wirelessly accessing the vehicle via a mobile app, the smart phone's operating system will remain to cause the phone's wireless transceiver to scan for other wireless beacons or BLE circuitry of devices within its proximity. Such scanning can additionally take a toll on the smart phone's battery life. It is therefore desirable to provide a virtual key to the vehicle via the smart phone's BLE transceiver to save energy and not drain the smart phone's battery as quickly. It is further desirable to cause the smart phone to cease attempting to establish a SRWC connections while the virtual key is being used to access the vehicle. Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method to receive a virtual key at a vehicle, the method including the steps of—establishing a dummy short-range wireless communications (SRWC) connection with a mobile computing device; establishing a standard SRWC connection with the mobile computing device; and receiving the virtual key from the mobile computing device through the standard SRWC connection. Other embodiments of this aspect include corresponding computer systems, apparatus, and computer programs recorded on one or more computer storage devices, each configured to perform the actions of the methods.

Implementations may include one or more of the following features. The method further includes performing a secure authentication of the mobile computing device to establish the standard SRWC connection. The method where performing the secure authentication of the mobile computing device includes comparing general identification information from the mobile computing device with information stored to a memory. The method where the general identification information includes a serial number of the mobile computing device. The method further includes authenticating the virtual key by comparing the virtual key to information previously received from a remote facility. The method further includes, after the virtual key has been received from the mobile computing device, providing the mobile computing device with access to the vehicle. The method where the SRWC connection is a BLUETOOTH connection or a BLUETOOTH low energy (BLE) connection. Implementations of the described techniques may include hardware, a method or process, or computer software on a computer-accessible medium.

One general aspect includes a system to receive a virtual key at a vehicle, the system includes a memory configured to include a plurality of executable instructions and a processor configured to execute the executable instructions, where the executable instructions enable the processor to establish a dummy short-range wireless communications (SRWC) connection with a mobile computing device; establish a standard SRWC connection with the mobile computing device; receive the virtual key from the mobile computing device through the standard SRWC connection; and where the dummy SRWC connection is configured to cause the mobile computing device to cease attempting to establish one or more additional SRWC connections. Other embodiments of this aspect include corresponding computer systems, apparatus, and computer programs recorded on one or more computer storage devices, each configured to perform the actions of the methods.

Implementations may include one or more of the following features. The system where the executable instructions further enable the processor to perform a secure authentication of the mobile computing device to establish the standard SRWC connection. The system where perform the secure authentication of the mobile computing device includes comparing general identification information from the mobile computing device with information stored to a memory. The system where the general identification information includes a serial number of the mobile computing device. The system where the executable instructions further enable the processor to authenticate the virtual key by comparing the virtual key to information previously received from a remote facility. The system where the executable instructions further enable the processor to, after the virtual key has been received from the mobile computing device, provide the mobile computing device with access to the vehicle. The system where the SRWC connection is a BLUETOOTH connection or a BLUETOOTH low energy (BLE) connection. Implementations of the described techniques may include hardware, a method or process, or computer software on a computer-accessible medium.

One general aspect includes a non-transitory and machine-readable medium having stored thereon executable instructions adapted to receive a virtual key at a vehicle, which when provided to a processor and executed thereby, causes the processor to carry out establish a dummy short-range wireless communications (SRWC) connection with a mobile computing device; establish a standard SRWC connection with the mobile computing device; receive the virtual key from the mobile computing device through the standard SRWC connection; and where the dummy SRWC connection is configured to cause the mobile computing device to cease attempting to establish additional SRWC connections. Other embodiments of this aspect include corresponding computer systems, apparatus, and computer programs recorded on one or more computer storage devices, each configured to perform the actions of the methods.

Implementations may include one or more of the following features. The non-transitory and machine-readable medium where the processor further carries out: perform a secure authentication of the mobile computing device to establish the standard SRWC connection. The non-transitory and machine-readable medium where perform the secure authentication of the mobile computing device includes comparing general identification information from the mobile computing device with information stored to a memory. The non-transitory and machine-readable medium where the general identification information includes a serial number of the mobile computing device. The non-transitory and machine-readable medium where the processor further carries out authenticating the virtual key by comparing the virtual key to information previously received from a remote facility. The non-transitory and machine-readable medium where: the processor further carries out, after the virtual key has been received from the mobile computing device, provide the mobile computing device with access to the vehicle. Implementations of the described techniques may include hardware, a method or process, or computer software on a computer-accessible medium.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
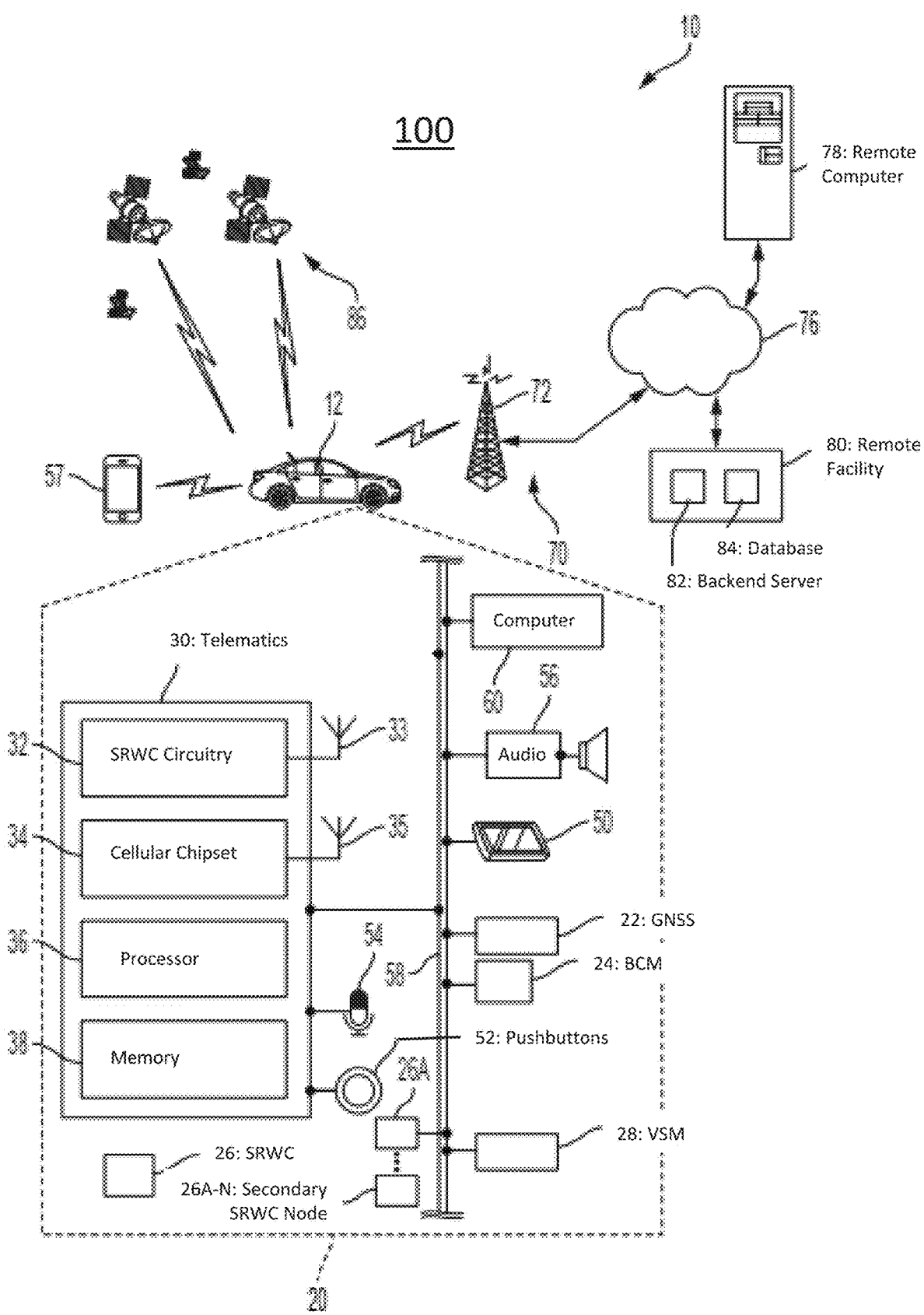
FIG. 1 is a block diagram depicting an exemplary embodiment of system capable of utilizing the system and method disclosed herein.
Figure 2:
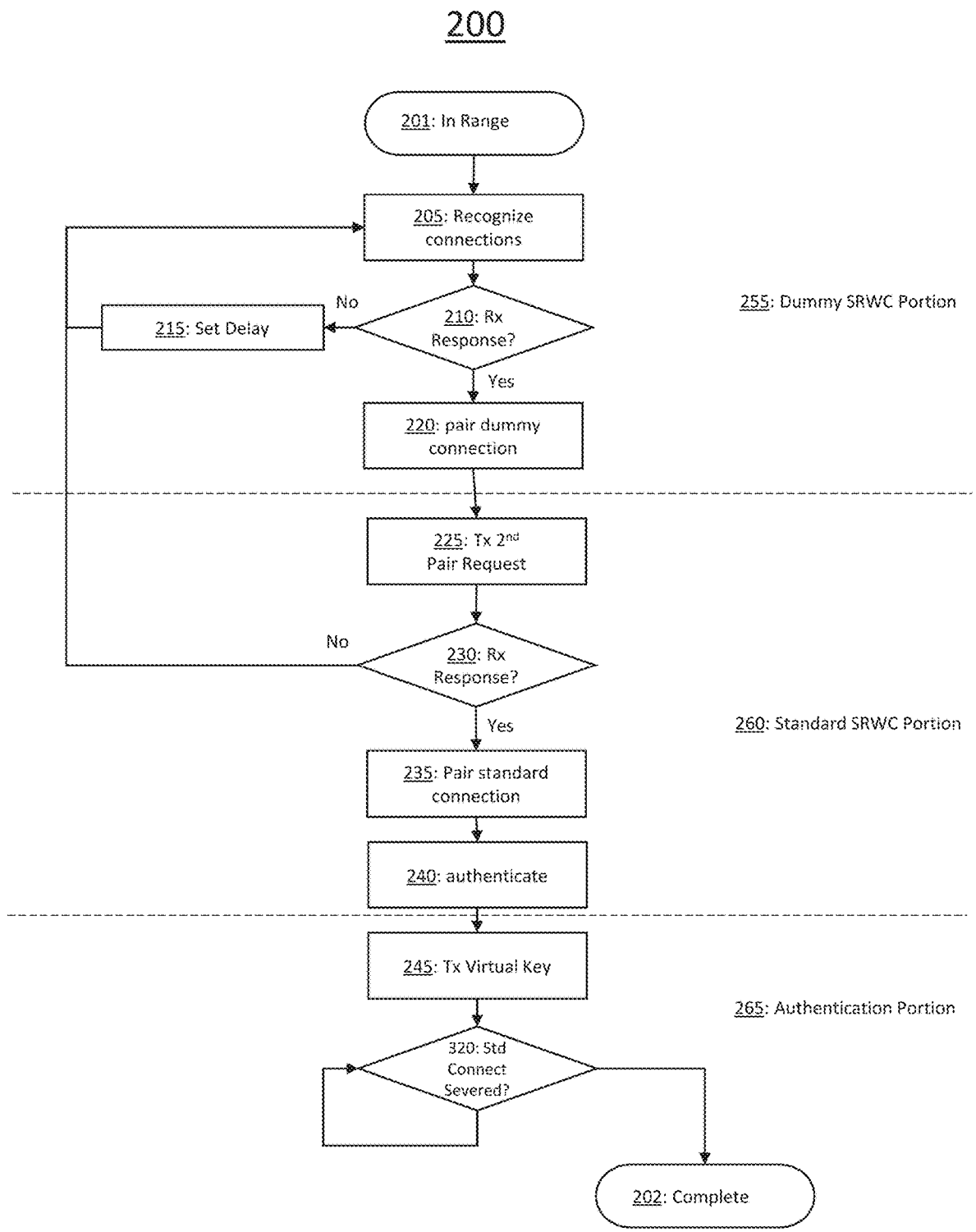
FIG. 2 shows a flow chart generally illustrating an exemplary method that may be performed to receive a virtual key.

With reference to FIG. 1, there is shown an operating environment that comprises a communications system 10 and that can be used to implement the method disclosed herein. Communications system 10 generally includes a vehicle 12 that includes vehicle electronics 20, one or more wireless carrier systems 70, a land communications network 76, a computer or server 78, a vehicle backend services facility 80, and a constellation of global navigation satellite system (GNSS) satellites 86. It should be understood that the disclosed method can be used with any number of different systems and is not specifically limited to the operating environment shown here. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft including unmanned aerial vehicles (UAVs), etc., can also be used. In certain embodiments, vehicle 12 may include a power train system with multiple generally known torque-generating devices including, for example, an engine. The engine may be an internal combustion engine that uses one or more cylinders to combust fuel, such as gasoline, in order to propel vehicle 12. The power train system may alternatively include numerous electric motors or traction motors that convert electrical energy into mechanical energy for propulsion of vehicle 12.

Some of the vehicle electronics 20 are shown generally, in FIG. 1 and includes a global navigation satellite system (GNSS) receiver 22, a body control module or unit (BCM) 24, other vehicle system modules (VSMs) 28, a telematics unit 30, vehicle-user interfaces 50-56, and onboard computer 60. Some or all of the different vehicle electronics may be connected for communication with each other via one or more communication busses, such as communications bus 58. The communications bus 58 provides the vehicle electronics with network connections using one or more network protocols and can use a serial data communication architecture. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few. In other embodiments, a wireless communications network that uses short-range wireless communications (SRWC) to communicate with one or more VSMs of the vehicle can be used. In one embodiment, the vehicle 12 can use a combination of a hardwired communications bus 58 and SRWCs. The SRWCs can be carried out using the telematics unit 30, for example.

The vehicle 12 can include numerous vehicle system modules (VSMs) as part of vehicle electronics 20, such as the GNSS receiver 22, BCM 24, telematics unit 30 (vehicle communications system), vehicle-user interfaces 50-56, and onboard computer 60, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is hardwire connected by communications bus 58 to the other VSMs including the telematics unit 30. Moreover, each of the VSMs can include and/or be communicatively coupled to suitable hardware that enables intra-vehicle communications to be carried out over the communications bus 58; such hardware can include, for example, bus interface connectors and/or modems. One or more VSMs 28 may periodically or occasionally have their software or firmware updated and, in some embodiments, such vehicle updates may be over the air (OTA) updates that are received from computer 78 or remote facility 80 via land network 76 and telematics unit 30. As is appreciated by those skilled in the art, the above-mentioned VSMs are only examples of some of the modules that may be used in vehicle 12, as numerous others are also possible. It should also be appreciated that these VSMs can otherwise be known as electronic control units, or ECUs.

Global navigation satellite system (GNSS) receiver 22 receives radio signals from a constellation of GNSS satellites 86. The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 86. And, in another example, GNSS receiver 22 can be a BDS receiver that receives a plurality of GNSS (or BDS) signals from a constellation of GNSS (or BDS) satellites 86. The GNSS received can determine a current vehicle location based on reception of a plurality of GNSS signals from the constellation of GNSS satellites 86. The vehicle location information can then be communicated to the telematics unit 30, or other VSMs, such as the onboard computer 60. In one embodiment (as shown in FIG. 1), the wireless communications module 30 and/or a telematics unit can be integrated with the GNSS receiver 22 so that, for example, the GNSS receiver 22 and the telematics unit 30 (or the wireless communications device) are directly connected to one another as opposed to being connected via communications bus 58. In other embodiments, the GNSS receiver 22 is a separate, standalone module or there may be a GNSS receiver 22 integrated into the telematics unit 30 in addition to a separate, standalone GNSS receiver connected to telematics unit 30 via communications bus 58.

Body control module (BCM) 24 can be used to control various VSMs 28 of the vehicle, as well as obtain information concerning the VSMs, including their present state or status, as well as sensor information. The BCM 24 is shown in the exemplary embodiment of FIG. 1 as being electrically coupled to the communication bus 58. In some embodiments, the BCM 24 may be integrated with or part of a center stack module (CSM) and/or integrated with telematics unit 30 or the onboard computer 60. Or, the BCM may be a separate device that is connected to other VSMs via bus 58. The BCM 24 can include a processor and/or memory, which can be similar to processor 36 and memory 38 of telematics unit 30, as discussed below. The BCM 24 may communicate with wireless device 30 and/or one or more vehicle system modules, such as an engine control module (ECM), audio system 56, or other VSMs 28; in some embodiments, the BCM 24 can communicate with these modules via the communications bus 58. Software stored in the memory and executable by the processor enables the BCM to direct one or more vehicle functions or operations including, for example, controlling central locking, power windows 11, power sun/moon roof, the vehicle's head lamps 98, the horn system 99, air conditioning, power mirrors, controlling the vehicle primary mover (e.g., engine, primary propulsion system), and/or controlling various other vehicle modules. In one embodiment, the BCM 24 can be used (at least in part) to detect a vehicle event, such as a power on state or a power off state, based on one or more onboard vehicle sensor readings, as discussed more below.

Telematics unit 30 is capable of communicating data via SRWC through use of SRWC circuit 32 and/or via cellular network communications through use of a cellular chipset 34, as depicted in the illustrated embodiment. The telematics unit 30 can provide an interface between various VSMs of the vehicle 12 and one or more devices external to the vehicle 12, such as one or more networks or systems at remote facility 80. This enables the vehicle to communicate data or information with remote systems, such as remote facility 80.

In at least one embodiment, the telematics unit 30 can also function as a central vehicle computer that can be used to carry out various vehicle tasks. In such embodiments, the telematics unit 30 can be integrated with the onboard computer 60 such that the onboard computer 60 and the telematics unit 30 are a single module. Or, the telematics unit 30 can be a separate central computer for the vehicle 12 in addition to the onboard computer 60. Also, the wireless communications device can be incorporated with or a part of other VSMs, such as a center stack module (CSM), body control module (BCM) 24, an infotainment module, a head unit, a telematics unit, and/or a gateway module. In some embodiments, the telematics unit 30 is a standalone module, and can be implemented as an OEM-installed (embedded) or aftermarket device that is installed in the vehicle.

In the illustrated embodiment, telematics unit 30 includes, the SRWC circuit 32, the cellular chipset 34, a processor 36, memory 38, SRWC antenna 33, and antenna 35. The telematics unit 30 can be configured to communicate wirelessly according to one or more SRWC protocols such as any of the Wi-Fi™, WiMAX™, Wi-Fi™ Direct, other IEEE 802.11 protocols, ZigBee™ Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. And, in some embodiments, the telematics unit 30 can be configured to communicate using IEEE 802.11p such that the vehicle can carry out vehicle-to-vehicle (V2V) communications, or vehicle-to-infrastructure (V2I) communications with infrastructure systems or devices, such as the remote facility 80. And, in other embodiments, other protocols can be used for V2V or V2I communications.

The SRWC circuitry 32 (i.e., a SRWC transceiver) enables the telematics unit 30 to transmit and receive SRWC signals, such as Bluetooth Low Energy (BLE) signals, along various network connection types. The SRWC circuitry 32 can allow the telematics unit 30 to connect to another SRWC device (e.g., mobile computing device 57) via one or more connections. The SRWC circuit 32 can be in communication with one or more subset components, embodied as SRWC nodes 26, that are installed at locations throughout vehicle 12 (e.g., a center stack node 26A, at telematics unit 30, and secondary SRWC nodes 26A-26E, located elsewhere within the vehicle 12). Each subset SRWC node 26 incorporates a SRWC radio sensor and is thus a transceiver that can transmit and receive SRWC serial data signals (via an SRWC protocol) to and from SRWC circuitry 32 and other SRWC devices (e.g., mobile computing device 57). SRWC circuitry 32 can also provide passive detection of the absence or presence of a virtual vehicle key (on behalf of telematics unit 30). The SRWC circuitry 32 can use authentication information received from remote facility 80 to determine if a mobile computing device 57 with a virtual key downloaded thereon is authorized/authentic to vehicle 12. If the virtual key is deemed authentic, the SRWC circuitry 32 can send a command to BCM 24 permitting access to the vehicle 12. Additionally, in some embodiments, the telematics unit 30 contains a cellular chipset 34 thereby allowing the device to communicate via one or more cellular protocols, such as those used by cellular carrier system 70, through antenna 35. In such a case, the telematics unit 30 is user equipment (UE) that can be used to in carry out cellular communications via cellular carrier system 70.

Antenna 35 is used for communications and is generally known to be located throughout vehicle 12 at one or more locations external to the telematics unit 30. Using antenna 35, telematics unit 30 may enable the vehicle 12 to be in communication with one or more local or remote networks (e.g., one or more networks at remote facility 80 or computers 78) via packet-switched data communication. This packet switched data communication may be carried out through use of a non-vehicle wireless access point or cellular system that is connected to a land network via a router or modem. When used for packet-switched data communication such as TCP/IP, the communications device 30 can be configured with a static Internet Protocol (IP) address or can be set up to automatically receive an assigned IP address from another device on the network such as a router or from a network address server.

Packet-switched data communications may also be carried out via use of a cellular network that may be accessible by the telematics unit 30. Communications device 30 may, via cellular chipset 34, communicate data over wireless carrier system 70. In such a scenario, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

One of the networked devices that can communicate with the telematics unit 30 is a mobile computing device 57, such as a smart phone, personal laptop computer, smart wearable device, or tablet computer having two-way communication capabilities, a netbook computer, or any suitable combinations thereof. The mobile computing device 57 can include computer processing capability and memory (not shown) and a transceiver capable of communicating with wireless carrier system 70. Examples of the mobile computing device 57 include the iPhone™ manufactured by Apple, Inc., and the Droid™ manufactured by Motorola, Inc. as well as others. Mobile device 57 may moreover be used inside or outside of vehicle 12, and may be coupled to the vehicle by wire or wirelessly. One of the applications stored to the memory of mobile computing device 57 (i.e., a mobile app—not shown) can receive the virtual key (e.g., from remote facility 80 or computer 78) and store the virtual key to the memory of mobile computing device 57. Moreover, this mobile app can also retrieve the virtual key from the memory and assist in the key's wireless transmission, for example, to telematics unit 30.

When using a SRWC protocol (e.g., Bluetooth/Bluetooth Low Energy or Wi-Fi), mobile computing device 57 and telematics unit 30 (via SRWC circuitry 32) may pair/link one with another when within a wireless range (e.g., prior to experiencing a disconnection from the wireless network). Moreover, mobile computing device 57 and telematics unit 30 (via SRWC circuitry 32) may pair/link one with another through numerous network connection types (e.g., a dummy network/SRWC connection and standard network/SRWC connection). In order to link/pair, for one or more connection types, mobile computing device 57 and telematics unit 30 may act in a BEACON or DISCOVERABLE MODE having a general identification (ID); SRWC pairing is known to skilled artisans. The general identifier (ID) may include, e.g., the device's name, unique identifier (e.g., serial number), class, available services, and other suitable technical information. Once SRWC is established, for the first time, the devices may be considered bonded as will be appreciated by skilled artisans (i.e., they may recognize one another and/or connect automatically when they are in a predetermined proximity or range of one other. In other words—they may become, at least temporarily, network participants). Moreover, once the devices are considered bonded, telematics unit 30 (via SRWC circuitry 32) can use authentication information, previously received from remote facility 80 and stored to memory 34, to determine if mobile computing device 57 with virtual key is authorized/authentic to vehicle 12. If the virtual key is deemed authentic, telematics unit 30 (via SRWC circuitry 32) can send a command to BCM 44 permitting access to the vehicle 12.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the telematics unit 30 to provide a wide variety of services. For instance, in one embodiment, the processor 36 can execute programs or process data to carry out at least a part of the method discussed herein. Memory 38 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. In one embodiment, the telematics unit 30 also includes a modem for communicating information over the communications bus 58.

Vehicle electronics 20 also includes a number of vehicle-user interfaces that provide vehicle occupants with a means of providing and/or receiving information, including visual display 50, pushbutton(s) 52, microphone 54, and audio system 56. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, and/or control input. Audio system 56 provides audio output to a vehicle occupant and can be a dedicated, stand-alone system or part of the primary vehicle audio system. According to one embodiment, audio system 56 is operatively coupled to both vehicle bus 58 and an entertainment bus (not shown) and can provide AM, FM and satellite radio, CD, DVD, and other multimedia functionality. This functionality can be provided in conjunction with or independent of an infotainment module. Microphone 54 provides audio input to the telematics unit 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, a video projector that projects images onto the windshield from the vehicle cabin ceiling, or some other display. Various other vehicle-user interfaces can also be utilized, as the interfaces of FIG. 1 are only an example of one particular implementation.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components that may be needed to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with a vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), networks providing broadband wireless access (BWA), or any combination thereof.

The computers 78 (only one shown) can be used for one or more purposes, such as for providing backend vehicle services to a plurality of vehicles (such as vehicle 12) and/or for providing other vehicle-related services. The computers 78 can be some of a number of computers accessible via a private or public network such as the Internet. Other such accessible computers 78 can be, for example: a service center computer where diagnostic information and other vehicle data can be uploaded from the vehicle; a client computer used by the vehicle owner or other subscriber for various purposes, such as accessing and/or receiving data communicated from the vehicle, as well as setting up and/or configuring subscriber preferences or controlling vehicle functions; or a vehicle telemetry data server that receives and stores data from a plurality of vehicles.

Vehicle backend services facility 80 is a remote facility (or remote entity), meaning that it is located at a physical location that is located remotely from the vehicle 12. The vehicle backend services facility 80 (or "remote facility 80" for short) may be designed to provide the vehicle electronics 20 with a number of different system back-end functions through use of one or more electronic servers 82 or live advisors. The vehicle backend services facility 80 includes vehicle backend services servers 82 and databases 84, which may be stored on a plurality of memory devices. Remote facility 80 may receive and transmit data via a modem connected to land network 76. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Servers 82 can be computers or other computing devices that include at least one processor and memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally stored instructions, such as software or firmware, which enable the servers 82 to provide a wide variety of services. For network communications (e.g., intra-network communications, inter-network communications including Internet connections), the servers can include one or more network interface cards (NICs) (including, for example, wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Remote facility 80 can include a number of routers, modems, switches, or other network devices that can be used to provide networking capabilities, such as connecting with land network 76 and/or cellular carrier system 70.

Databases 84 can be stored on a plurality of memory, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. One or more databases 84 at the remote facility 80 can store various information and can include a vehicle operation database that stores information regarding the operation of various vehicles (e.g., vehicle telemetry or sensor data).

Method

The method or parts thereof can be implemented in a computer program product (e.g., a BCM 24, SRWC circuit 32, telematics unit 30, etc.) embodied in a computer readable medium and including instructions usable by one or more processors of one or more computers of one or more systems to cause the system(s) to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

Figure 3:
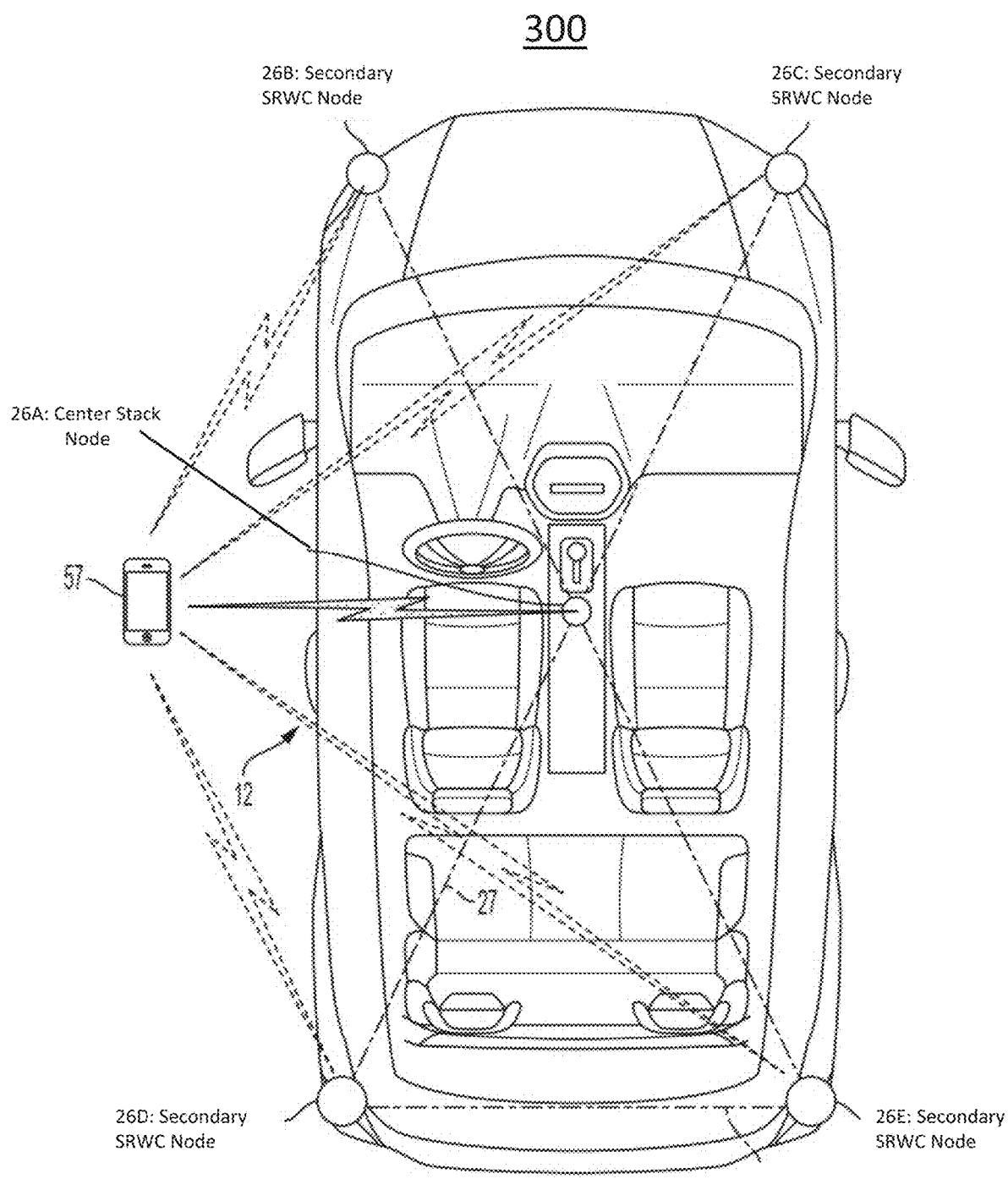
FIG. 3 shows one or more aspects of the exemplary method of FIG. 2.

Method 200 begins at 201 in which mobile computing device 57 moves into range of telematics unit 30 and SRWC circuit 32. Moreover, both mobile computing device 57 and telematics unit are each in a BEACON or DISCOVERABLE MODE. In step 205, due to previously established connections, telematics unit 30 will recognize mobile computing device 57 (via the general identification (ID) information/general identifier (ID) information). In addition, in this step, telematics unit 30 will request mobile computing device 57 pair/link to it (via SRWC circuit 32) to "wake up" at least aspects of the operating system of the mobile computing device 57. In step 210, telematics unit 30 will determine if it has received a response to the pair/link request from mobile computing device 57. If a response is received, then method 200 will move to step 220; otherwise, the method 200 will move to step 215. In step 2015, telematics unit 30 will set a delay of a certain amount of time. For example, telematics unit 30 will set a delay of twenty (20) seconds. After the delay is set and the time period of the delay has concluded, method 200 will return to step 205. In step 220, telematics unit 30 and mobile computing device 57 will pair/link to each other via a dummy network connection. As follows, no significant information will be transferred along this connection and will mimic a wireless connection to a passive wireless smartphone accessory such as, for example a wireless earphone or speaker. This dummy network connection is merely to satisfy the connection requirements of the mobile app that stores the virtual key and, therefore, cause the mobile app to cease attempting to establish a SRWC connection (e.g., a BLUETOOTH, BLE, etc.) with one or more third-party devices or alternative vehicle devices (i.e., the mobile app will discontinue running in the background of the operating system of the mobile computing device 57—and will stop trying to establish additional SRWC connections with additional devices). As a result, the mobile app will not act as a drain on the operating system and thus the mobile app will not facilitate the depletion of the battery of mobile computing device 57. Moreover, it should be understood that, since this dummy network connection/dummy SRWC connection acts as a previously paired connection between telematics unit 30 and mobile computing device 57, the dummy network connection will have a higher priority on causing the mobile app to stop scanning for SRWC connectable devices within its proximity than a previously non-paired connection. Moreover, as can be understood with additional reference to FIG. 3, in certain embodiments, mobile computing device 57 will only establish a dummy network connection with the center stack node 26A (the central BLE unit) and will resultantly cause mobile computing device 57 and/or the mobile app to ignore any/all broadcasts/BLE advertisements from the secondary SRWC nodes 26B-26E. As can be understood, this portion of method 200 should be considered the previously-paired connection (otherwise known as a "dummy network connection" or "dummy SRWC connection") portion 255 of method 200.

In step 225, telematics unit 30 will send a subsequent, second request to link/pair to mobile computing device 57. This request will be made as if there has never been a wireless connection made between mobile computing device 57 and telematics unit 30. Therefore, mobile computing device 30 will request general ID information from mobile computing device 57. As such, mobile computing device 30 will request information such as, but not limited to, the device's name and unique identifier (e.g., serial number). In step 230, telematics unit 30 will determine if it has received a response to the pair/link request from mobile computing device 57. This response will include at least the unique identifier and name of mobile computing device 57. If a response is received, then method 200 will move to step 235; otherwise, the method 200 will return to step 205. In step 235, telematics unit 30 and mobile computing device 57 will pair/link to each other via a standard network connection. In step 240, using the general ID information (e.g., the unique identifier and device name) telematics unit 30 will perform a secure authentication of mobile computing device 57. As follows, telematics unit 30 will secure the connection with the mobile computing device 57 after comparing the general ID information with information it has stored in memory 34 and thus verifying the authenticity of the mobile computing device 57. As can be understood, this portion of method 200 should be considered the non-previously-paired network connection (otherwise known as a "standard network connection" or "standard SRWC connection") portion 260 of method 200.

In step 245, once a secure connection is established, mobile computing device 57 will transfer its virtual key to telematics unit 30, where telematic unit 30 can at least temporarily store key to memory 34. Telematics unit 30 will then authenticate the virtual key by comparing the key to encryption information the telematics unit 30 previously received from remote facility 80, to verify and ensure the key is authentic to vehicle 12. In essence, telematics unit 30 will compare an encryption code, which is part of the virtual key, to an encryption code it previously received from remote facility 80. Once the virtual key has been authenticated, telematics unit 30 will provide access rights to vehicle operations via BCM 24 (e.g., door lock/unlock controls) and other vehicle operation rights via VSMs 28 (e.g., authorization to start the engine's engine). In step 250, telematics unit 30 will determine if at least the standard network connection has been severed, for example, because mobile computing device 57 has physically been moved outside of the range for a proper SRWC connection. If the standard network connection has been severed, method 200 will move to completion 202. Moreover, when the standard network connection has been severed, telematics unit 30 may delete the virtual key from memory 34. If the standard network connection remains intact, method 200 will remain on step 250. As can be understood, this portion of method 200 should be considered the authentication portion 265 of method 200. As mentioned above, a non-previously-paired connection/standard SRWC connection has a lower priority when it comes to scanning for SRWC devices in proximity of mobile computing device 57. Therefore, it should be understood that the standard SRWC connection is more suitable for transmitting the virtual key to telematics unit 30 and the dummy network connection is more suitable for causing mobile computing device 57 to cease scanning for SRWC devices.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method to receive a virtual key at a vehicle, the method comprising:
   establishing a dummy short-range wireless communications (SRWC) connection with a mobile computing device;
   establishing a standard SRWC connection with the mobile computing device in response to establishing the dummy SRWC connection;
   receiving the virtual key from the mobile computing device through the standard SRWC connection in response to establishing the dummy SRWC connection; and
   providing access to the vehicle in response to receiving the virtual key from the mobile computing device.

2. The method of claim 1, further comprising:
   performing a secure authentication of the mobile computing device to establish the standard SRWC connection.

3. The method of claim 2, wherein performing the secure authentication of the mobile computing device comprises:
   comparing general identification information from the mobile computing device with information stored to a memory.

4. The method of claim 3, wherein the general identification information comprises a serial number of the mobile computing device.

5. The method of claim 1, further comprising:
   authenticating the virtual key by comparing the virtual key to information previously received from a remote facility.

6. A system to receive a virtual key at a vehicle, the system comprises:
   a memory configured to comprise a plurality of executable instructions and a processor configured to execute the executable instructions, wherein the executable instructions enable the processor to:
   establish a dummy short-range wireless communications (SRWC) connection with a mobile computing device;
   establish a standard SRWC connection with the mobile computing device in response to an establishment of the dummy SRWC connection;
   receive the virtual key from the mobile computing device through the standard SRWC connection in response to an establishment of the standard SRWC connection wherein the dummy SRWC connection is configured to cause the mobile computing device to cease attempting to establish one or more additional SRWC connections; and
   providing access to the vehicle in response to receiving the virtual key from the mobile computing device.

7. The system of claim 6, wherein:
   the executable instructions further enable the processor to:
   perform a secure authentication of the mobile computing device to establish the standard SRWC connection.

8. The system of claim 7, wherein perform the secure authentication of the mobile computing device comprises:
   compare general identification information from the mobile computing device with information stored to a memory.

9. The system of claim 8, wherein the general identification information comprises a serial number of the mobile computing device.

10. The system of claim 6, wherein:
the executable instructions further enable the processor to:
authenticate the virtual key by comparing the virtual key to information previously received from a remote facility.

11. A non-transitory and machine-readable medium having stored thereon executable instructions adapted to receive a virtual key at a vehicle, which when provided to a processor and executed thereby, causes the processor to carry out:
establish a dummy short-range wireless communications (SRWC) connection with a mobile computing device;
establish a standard SRWC connection with the mobile computing device in response to an establishment of the dummy SRWC connection;
receive the virtual key from the mobile computing device through the standard SRWC connection in response to an establishment of the standard SRWC connection wherein the dummy SRWC connection is configured to cause the mobile computing device to cease attempting to establish additional SRWC connections; and
providing access to the vehicle in response to receiving the virtual key from the mobile computing device.

12. The non-transitory and machine-readable medium of claim 11, wherein:
the processor further carries out:
perform a secure authentication of the mobile computing device to establish the standard SRWC connection.

13. The non-transitory and machine-readable medium of claim 12, wherein perform the secure authentication of the mobile computing device comprises:
compare general identification information from the mobile computing device with information stored to a memory.

14. The non-transitory and machine-readable medium of claim 13, wherein the general identification information comprises a serial number of the mobile computing device.

15. The non-transitory and machine-readable medium of claim 11, wherein:
the processor further carries out:
authenticate the virtual key by comparing the virtual key to information previously received from a remote facility.

* * * * *